United States Patent [19]

Stefanski

[11] Patent Number: 5,450,315
[45] Date of Patent: Sep. 12, 1995

[54] APPARATUS USING A NEURAL NETWORK FOR POWER FACTOR CALCULATION

[75] Inventor: John J. Stefanski, Raleigh, N.C.

[73] Assignee: Square D Company, Palatine, Ill.

[21] Appl. No.: 312,342

[22] Filed: Sep. 26, 1994

[51] Int. Cl.⁶ .................. G05B 13/02; B23K 11/24
[52] U.S. Cl. ..................... 364/148; 395/22; 219/110
[58] Field of Search .......... 364/148, 477, 482, 483, 364/551.01, 551.02; 395/21-23, 24; 219/108-110, 114, 117.1, 130.01, 130.21

[56] References Cited

U.S. PATENT DOCUMENTS

| | | | |
|---|---|---|---|
| 4,399,511 | 8/1983 | Jurek | 364/477 |
| 4,493,040 | 1/1985 | Vanderhelst | 364/477 |
| 4,516,008 | 5/1985 | Jones | 219/109 |
| 4,885,451 | 12/1989 | Farrow et al. | 219/110 |
| 4,945,201 | 7/1990 | Ito et al. | 219/110 |
| 5,083,003 | 1/1992 | Clark, Jr. et al. | 219/110 |
| 5,166,491 | 11/1992 | Izume et al. | 219/110 |
| 5,283,418 | 2/1994 | Bellows et al. | 395/22 |
| 5,306,893 | 4/1994 | Morris et al. | 395/22 |

*Primary Examiner*—Roy N. Envall, Jr.
*Assistant Examiner*—Steven R. Garland
*Attorney, Agent, or Firm*—Michael J. Femal; Richard J. Graefe; Larry I. Golden

[57] ABSTRACT

A weld controller utilizes a neural network to compute power factor of a secondary circuit of a welding transformer supply power to a workpiece through a pair of welding electrodes. Phase controlled switches supply power to the transformer and the neural network uses the phase angle at the time of energization of the switches and the length of time that the switches conduct to compute the power factor. The computed power factor is compared with previous computations of power factor online and any changes are interpreted as changes in resistance of the secondary circuit. This provides a measure of contact wear and the weld controller can compensate for these changes by increasing weld power. The neural network is adaptable for use with other types of control systems.

16 Claims, 4 Drawing Sheets

APPARATUS USING A NEURAL NETWORK FOR POWER FACTOR CALCULATION

TECHNICAL FIELD

Applicant's invention relates generally to the field of weld controllers and more particularly to a microprocessor based weld controller system for controlling the amount of power supplied by the weld controller to electrodes of the weld controller for a targeted weld current during the life of the electrodes.

BACKGROUND ART

Two critical parameters effect the quality and consistency of a weld between two or more work pieces, weld gun pressure and the current density in the region to be welded. Weld gun pressure is readily regulated by pneumatic, hydraulic, or other mechanical means. Current density regulation requires an electronic solution. Many methods have been utilized to regulate and maintain the current density constant within the contact area between weld gun contact tips and the material to be welded. As the contact tips deteriorate, the contact area increases, resulting in a decrease in the current density at the weld nugget. This results in a decreased heat input and can result in weld defects. Compensation for this decrease in current density over the life of the tips can be accomplished through several different methods to increase or boost the current. Less heat and thus less current, is required during the first or early stage of the contact tips' life. Once the contact tips have settled in, during a second stage, a gradual increase in heat is required. During the last stage, as the contact tips start to deform, even more heat is required. These three stages form a user profile for the current or heat boost.

Earlier weld controllers modified the firing angle of SCR switches to regulate the conduction angle of the SCRs to a particular percentage of full or 180 degree conduction. This mode of operation, known as a voltage compensation method, does not regulate current directly. A second method measures the available heat as a function of the overall system power factor, and provides a user programmed percentage of that available heat following a profile based on the above mentioned three stages of the contact tip lifetime. This method will or could provide for line voltage variations. The user adjusts either the percent conduction angle or the percent heat in either of these methods to achieve a desired weld current as measured by external means.

Some weld controllers provide a third method which uses a constant current control which will adjust the firing angle of the SCRs to maintain a predetermined current flow to the contact tips based on the user profile. The use of stepper programs implements this method by increasing the current in equal increments according to the user profile. Some prior art weld controllers employ a manual stepper to adjust for the current boost, which typically is increased as a series of scheduled linear steps as specified by a weld engineer to obtain metallurgically sound welds during the life of the weld contact tips. For example, the first stage may be programmed to reach a 5 percent current boost in one percent increments after 200 weld cycles, the second stage may be programmed to reach a 10 percent current boost after 2000 weld cycles, and the last stage may be programmed for a 15 percent current boost after 8000 weld cycles. Commonly assigned U.S. Pat. No. 5,083,003 discloses an adaptive stepper which increases the heat boost and thus the current density as a function of not only the number of weld cycles but also as a function of expulsions. Expulsions, also known as spitting, generally indicate that too much heat is being applied during the weld cycle. Molten material is blown away from the weld zone during expulsion, resulting in a significant drop in resistance at the primary of the weld transformer supplying the contact tips.

In all of these cases, it becomes difficult to detect process variations in the welding cycle that could indicate other fault conditions. These variations occur as a result of either short term or long term impedance changes in the welder system. Short term changes are caused by variations in the workpiece and contact tip interface such as oxidation of the surface of the workpieces or poor part fit Long term effects are associated with tool or weld cable degradation or poor connections. With the first and second methods, this increased impedance will result in lower weld current. In the third method, the weld controller will attempt to directly compensate for the increase and regulate the current to maintain it at the constant, preset level, providing more and more power to the weld system, with possible expulsions occurring. The user would have no indication of a problem until it may be too late, as the system would have to detect an inability to regulate current to reach a current limit before error messages are generated. At that time, it would only indicate a failure of the control to regulate the weld current, which could be from many sources. There would be no indication of a change in system impedances. The current controlled system will continue to make metallurgically sound welds until it fails catastrophically from lack of maintenance. A method to indicate changes in system impedances is therefore desirable.

Quality and strength of a spot weld can be correlated with a change in resistance as measured through the weld as the weld progresses during the fusion process. This will effect a change in the power factor of the circuit which will be reflected from the secondary circuit of the welding transformer coupling power to the contact tips to the primary circuits and will result in a significant drop in resistance at the primary circuit. The timing changes resulting from this change can be sensed by the microprocessor based weld controller system. The amount of increase or decrease in the current conduction angle can be determined from these changes and can become a basis for controlling the welding heat applied to the workpiece being welded. U.S. Pat. No. 4,399,511 describes one such type of control. The controller measures the weld current conduction time from the point of initiation to the point of extinction. The conduction time, when added to the original time delay of the initiation signal, is related to the power factor. Using a numerical representation a characteristic resistance curve that relates the ohmic resistance of the work piece as a function of time and weld cycles, the measured and calculated power factor changes can be compared with this curve to determine if more or less energy is required to be supplied to the welding tips. This requires the use of look-up tables or complicated calculations that are non-trivial to calculate the power factor for each weld cycle.

SUMMARY OF THE INVENTION

Accordingly, the principal object of the present invention is to provide a weld controller having a system for detecting and reporting changes in system impedances.

A further objective of the invention is to provide an apparatus for acquiring weld current and voltage data samples during welding operations, including acquisition, measurement, and conversion of the data for each weld cycle of a weld schedule during the lifetime of a set of contact tips. This data is used to provide input to a means for calculating a power factor of the system.

Still a further objective of the invention is to provide an apparatus for calculating the power factor of the system by using a neural network instead of the more conventional lookup table method.

A microprocessor based weld controller has provisions for generating delayed firing signals to control conduction of inversely connected SCR welding contactors. These firing signals are part of a predetermined weld schedule that varies the time of conduction of the SCRs for controlling The applied welder current to the workpieces being welded. Power factor may be one variable of the weld schedule. Other controlling factors could be number of weld cycles, commonly used in stepper programs, power control, or current limit control. In addition to being a feedback signal for the weld controller, power factor can be used to optimize operation of the welder. It is well known that having many weld controllers operating at the same time on an assembly line affects the power factor of the installation. This causes voltage zero crossings to vary and each weld controller had to be tuned to the power factor. Having a system that can calculate power factor can be greatly advantageous.

In the preferred embodiment of the invention, the invention is comprised of a system of elements including a two-input, one-output neural network resident in the weld controller. The time delay, known as firing angle, becomes one input A of the neural network resident in the weld controller. The other input B is a measure of the actual conduction time of the SCRs. The network is trained off-line using a preprocessed solution of a equation that relates A and B to power factor. The network weights and biases which resulted from the training are stored in smaller tables than that required for the lookup table method. During operation, the neural network simply calculates an output scaled to represent the power factor based on the two inputs. The weld controller will then use this output to control further weld cycles on a continuous, online basis.

A typical stepper weld controller uses a current transformer in the primary or secondary circuit of the welder. A potential transformer allows line voltage to be sensed. Analog to digital converters provide the required conversion of the output current and the input voltage to signals suitable for inputting to the microprocessor based (CPU) weld controller. The CPU reduces these signals to generate a current sample and voltage sample for each current boost step performed by the stepper program.

Following the stepper profile, weld power for each step is either measured directly or is calculated from the weld transformer RMS voltage, current, and power factor. The power factor is calculated using the neural network method. The acquired data is stored as a table of values relating the power or VA required to supply a particular primary or secondary current of a welding transformer to that primary or secondary current such that a characteristic power curve for a particular tool is established. Once the characteristic power curve exists, the weld controller, in subsequent operations, will compare the actual weld power with the characteristic power curve at each weld cycle and make appropriate adjustments to the firing angle to follow the characteristic power curve profile which represents the expected power at each step of the stepper current density compensation.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTOR

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
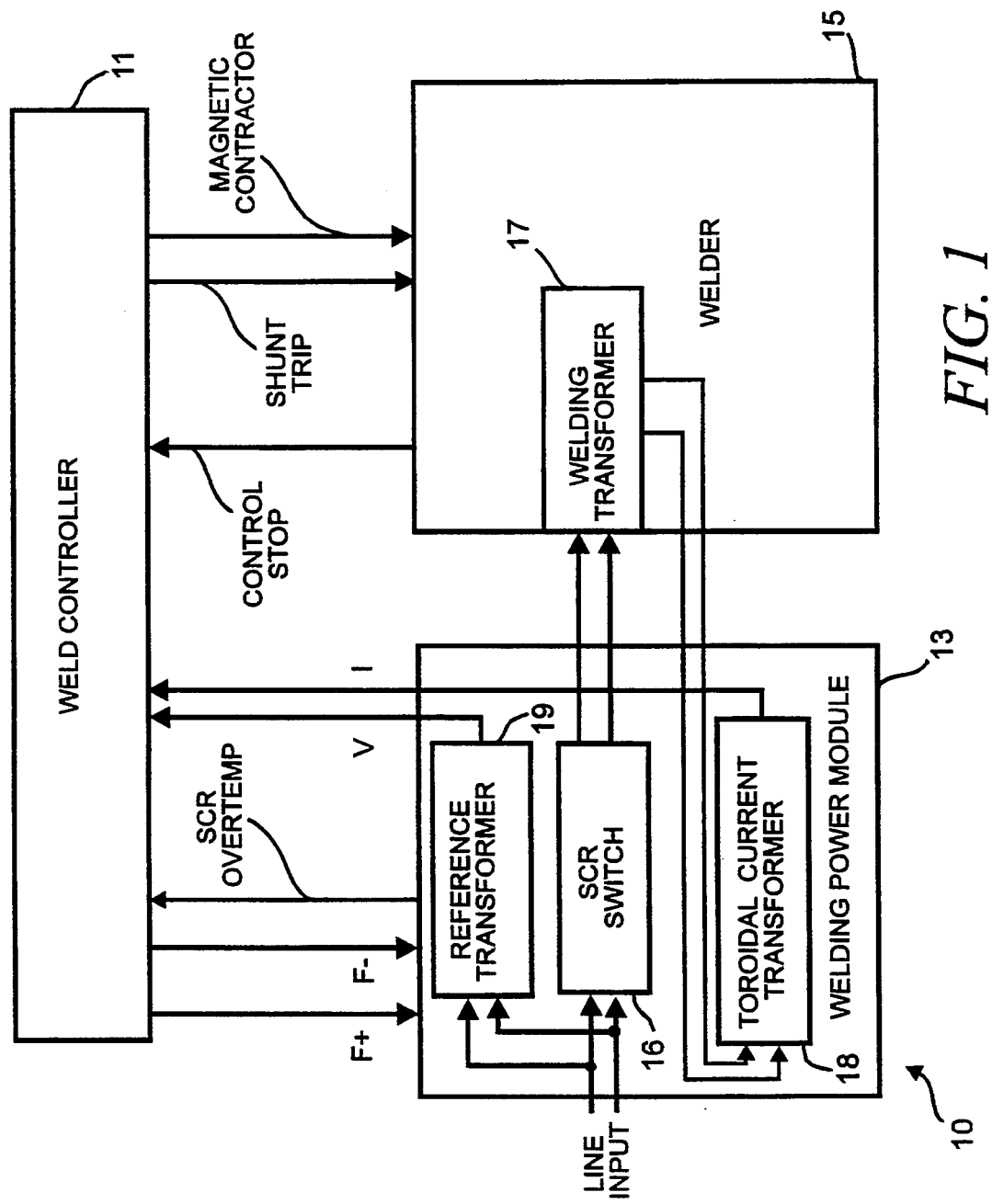
FIG. 1 is a block overview diagram showing a welder and weld controller system.

FIG. 1 illustrates a typical welder system 10 consisting of a weld controller 11, welder power module 13, and welder 15. Weld controller 11 generates firing signals F+ and F− used to energize or turn on SCR switch 16 which is coupled to welding transformer 17 to supply power to contact tips and the workpiece being welded. The primary current of welding transformer 17 is monitored by using a toroidal current transformer 18 coupled to its primary circuit. A reference transformer 19 monitors the incoming line input voltage. In addition to voltage V and current I signals, weld controller 11 receives an over-temperature signal from the SCR switch 16 for use in control algorithms within the weld controller 11 as a protective feature to control or shutdown the welder 10 if the SCR switch reaches a predetermined temperature. Specific implementation details of a welder system 10 may be found in U.S. Pat. No. 4,945,201, although such details are not necessarily required for a correct understanding of the present invention.

Figure 2:
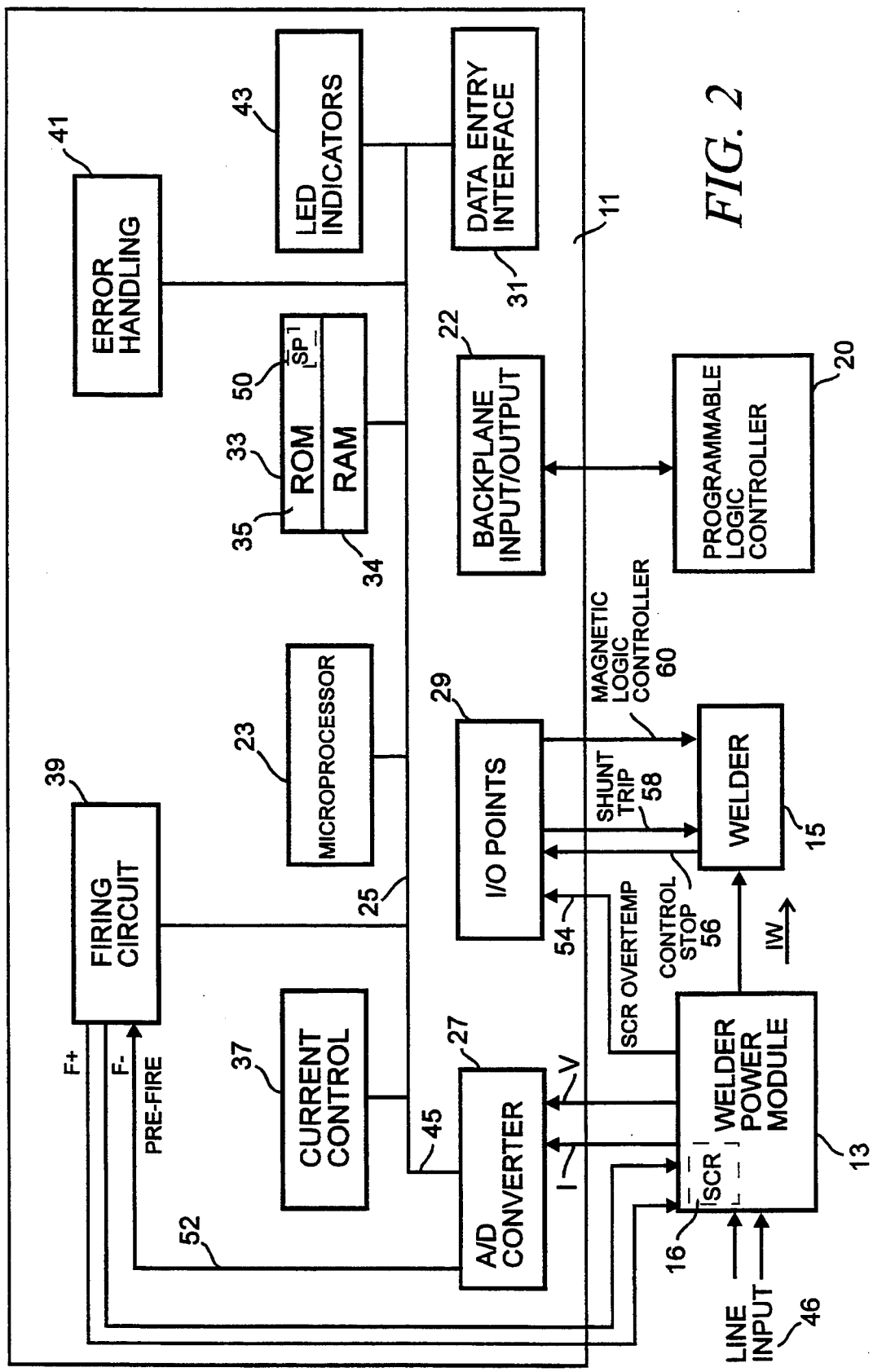
FIG. 2 is a detailed block diagram showing a welder and weld controller system implementing a system for calculating power factor according to the present invention.

Referring to FIG. 2, a block diagram details a welder 15 and weld controller 11 implementing a power factor calculation system according to the present invention. The weld controller 11 may be part of a larger system controlled by programmable logic controller (PLC) 20 or it may be self-contained. A backplane interface 22 provides a means of coupling the PLC 20 to microprocessor (CPU) 23 to a data bus 25. CPU 23 is also coupled via data bus 25 to A/D converter 27, input-/output interface 29, data entry interface 31, memory 33 comprising both RAM 34 and ROM 35, firing circuit 39, and LED indicators 43. LED indicators 43 provide status information of the weld controller 11. Control and timing signals required for operation of the CPU 23 are not shown as they are well known to those skilled in the art and not an object of the present invention. A program stored in ROM 35, similar to a program as disclosed in U.S. Pat. No. 4,516,008 provides control of the power module 13 and welder 15 and the welding process by operation of CPU 23. This program will generate SCR firing signals F+ and F− through firing circuit 39 to control the weld sequence in response to various input signals. The present invention improves the referenced program and other types of welder controls by adding an improved method of calculating power factor during the life of contact tips within the welder 15, as will be described below.

A two channel A/D converter 27 converts analog signals I and V from welder power module into digitalized signals 45 which represent welding transformer 17 primary weld current Iw and power line input voltage 46, respectively. Input voltage is from a regulated voltage source. The digitalized signals 45 are placed on bus 25 for storage in RAM 34 and for use as feedback control signals in execution of a weld control program 50 resident in ROM 35. The A/D converter 27 also generates a prefire signal 52 for inputting to firing circuit 39. An enable signal is also generated by control program 50 to prevent erroneous firing due to a possible program "hang-up" since two actions, prefire and enable, are required before the firing signals F+, F− are generated. Details regarding the firing circuit 39 and A/D converter 27, which are not a part of the present invention, are well known and will therefore not be described further.

The input/output interface 29 receives an input 54 from welder power module 13 if the temperature of the SCR switches 16 reaches a predetermined set point, indicative of an overtemperature condition. The temperature is monitored every weld cycle and if it reaches the set point, input 54 will cause the control program 50 to disable the weld current Iw and put an error message in error handling 41 which is actually a portion of the weld control program 50 in ROM 35. Control stop signal 56 is a signal generated within welder 15 as an interlock control and will be activated if an operator or an external device causes the interlock to open. Again, this signal 56 will cause the control program 50 to disable the weld current Iw and put an error message in the error handling 41. The external device is normally a palm button that is depressed to indicate an emergency condition that requires an immediate cancellation of the welding cycle. Since a shorted SCR switch 16 would result in continuous current to the welder 15, a shunt trip circuit breaker is placed in series within welder 15 to remove power if a shorted SCR condition occurs. This condition is assumed to exist if current I is sensed at a time when it has not been commanded by the welder control 11. The welder control 11 will generate a shunt trip signal 58 to cause the circuit breaker to trip out under the shorted SCR condition. An additional output 60 controls a magnetic contactor for use within the welder 15 and is energized when a welding sequence begins.

Current control 37 is also a portion of the weld control program 50 in ROM 35. Its primary function is to provide a constant current function for maintaining constant current density within the contact area between the weld gun contact tips and the material to be welded, as the contact tips mushroom through continued use. Several different methods exist for compensating for wear of the contact tips. In the preferred embodiment, power factor for the secondary circuits of welding transformer 17 is continuously calculated on-line by CPU 23 as a means of determining impedance changes in the secondary circuits. These changes not only include the contact tips, but the cables and interconnecting means as well. These changes will effect an increase or boost the welder current to compensate for the impedance changes. A stepper program 50 will also provide equal increments according to a user profile as specified by the programmed stepper. This profile generally will increment the current boost in discrete steps based on a number of weld cycles and is entered through the data entry interface 31 by a weld engineer.

Since the tooling providing the weld current can be quite complex, the Volt Amperes or power required to produce a given weld current can be difficult to predict. The present invention therefore has provisions for the weld controller 11 to measure the weld current and line voltage and calculate the power factor to arrive at a characteristic power curve over the range of currents as specified by the combination of the programmed weld current and the range of current boost as specified by the stepper schedule. When this function is enabled, the weld controller 11 will automatically compute the power or Volt Amperes required to deliver the target current at the appropriate current boost, and build a table of values relating weld current and delivered power or Volt Amperes. Once this table is complete, which occurs when the weld controller 11 has completed a stepper schedule, the table is available for an operator to edit, view, or copy into a characteristic power curve file for the weld system. Assuming the welding system is new or refurbished, the resulting curve or profile will be an accurate representation of the characteristic power curve for that particular weld system, relating power or Volt Amperes to the weld current, and using a stepper program to compensate for contact tip deformation. Although a stepper program is detailed, the present invention is not directed towards any particular type of welder program or sequencing method. The invention is more directed towards the system of generating a power factor and not necessarily in how the power factor is used within the weld controller.

Figure 3:
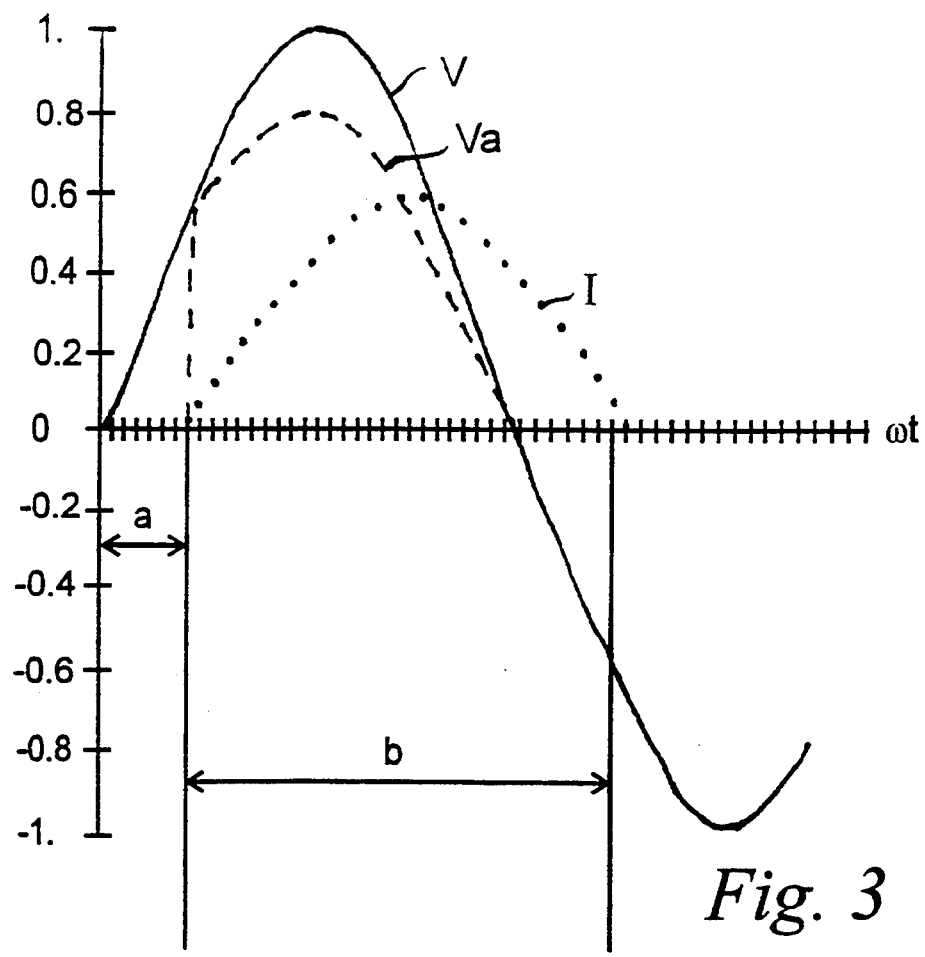
FIG. 3 is a graphical representation of weld current and voltage waveforms of the secondary circuit of a welder transformer.

FIG. 3 is a graphical representation of weld current I and voltage V waveforms versus radians of the secondary circuit of the welder transformer 17. I and V are normalized. Voltage Va represents the applied voltage to a workpiece being welded. Firing of the SCR switch 16 is delayed by a firing angle a. Conduction of the SCR at this switching point extends beyond the the point where Va reverses polarity. As the weld controller varies a, Va varies directly. Due to the inductive nature of the circuit, I does not completely extinguish until sometime after Va has reversed its polarity. This total conduction time b must be completed before the weld controller will turn on the opposite polarity SCR. If the weld control generates a firing pulse, either F+ or F− before this time has expired, the opposite SCR will not turn on, resulting in no current flow during that half cycle. If this is repeated, a DC current will be generated that could saturate and possible damage the welding transformer.

The secondary circuit can be considered a series circuit consisting of a voltage source Va, an inductance L, and a resistance R. The actual values of L and R depend on the components of the system, including interconnecting wiring and the contact tips, as well as the physical placement of these components and wiring. Due to wear of the interconnection cables during the life of the system, the resistance will generally increase. The values of L and R limit the power transfer capabilities of the weld controller by directly affecting the attainable values of I, as well as the phase relationship between Va and I. The weld controller 11 monitors the relationship between L and R by calculating the power factor, as defined by equations 1 and 2.

$$\text{power factor} = \cos(\theta) \qquad \text{Eq. 1}$$

$$\text{where } \theta = \arctan(wL/R) \qquad \text{Eq. 2}$$

The relationship between $\theta$ and the measurable quantities of a and b are given by equation 3.

$$\sin(a+b-\theta) = \sin(a-\theta)^* \exp[-b/\tan\theta] \qquad \text{Eq. 3}$$

Solving equation 3 for $\theta$ in terms of a and b is nontrivial, given its transcendental nature and the real time response required of the weld controller. It could be solved directly through numerical methods, but this is not feasible for a real time system and the computing power of the CPU 23 in the weld controller 11. In one method, a two dimensional lookup table having power factor entries is constructed using a and b as indices to solve equations 1–3. The power factor is simply read from the table given the values of a and b. This method is generally accurate and quite fast in terms of execution time. Its main drawback is the large amount of memory space required to store the data.

Figure 4:
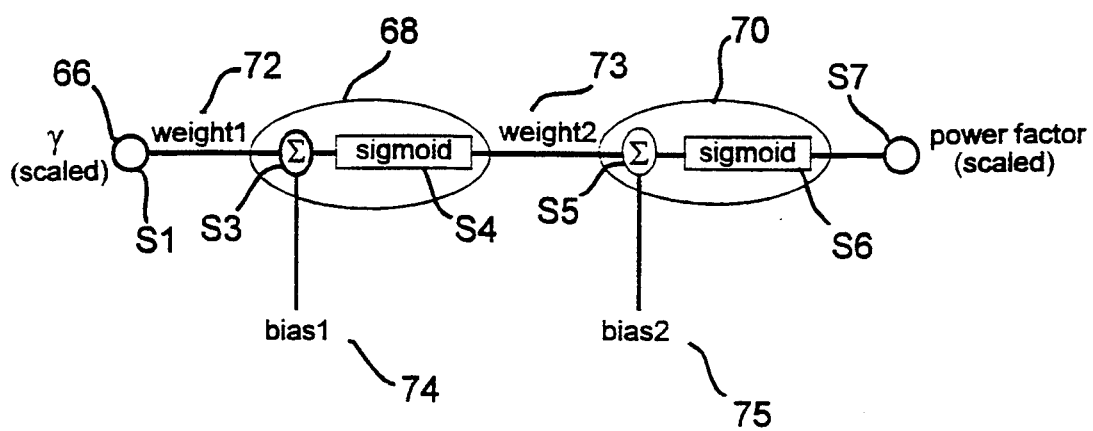
FIG. 4 is a model of a partial neural network of the present invention.

The present invention utilizes a neural network 65 as disclosed in FIG. 4. Network 65 is implemented by the C function pf_calc_nn(alpha,gamma) which is listed below. The network 65 modeled by the code is designed to minimize the number of neurons in order to maximize calculation speed. During operation, the neural network simply calculates the power factor output based on the given inputs a and b which are derived from the voltage V, the current I and the firing pulses F+ and F− by C PU 23. As shown by FIG. 4, the network has three fully connected layers, an input layer 66, a hidden layer 68, and an output layer 70. A single neuron is in both the hidden and output layers. This network 65 shows only one input b. The second input a is accounted for by creating and storing 64 sets of weights 72, 73 and biases 74, 75 for 64 possible values of a. 64 is chosen to provide a reasonable amount of accuracy, but any number could be used. This results in essentially 64 different neural networks, each having the same topology. This greatly reduces the complexity of the network and minimizes the recall time of the network 65.

The two input, a and b, and one output, power factor, network is trained off-line using preprocessed solutions to equations 1–3 as calculated using a standard iterative numerical method such as Levenberg-Marquardt. The network weights and biases which result from the training are also stored in tables preprogrammed in ROM 35.

All weights 72, 73 and biases 74, 75 are calculated via backpropagation training using Propagator(TM) from ARD Corporation. Training parameters for each of the 64 networks are identical.

Figure 5:
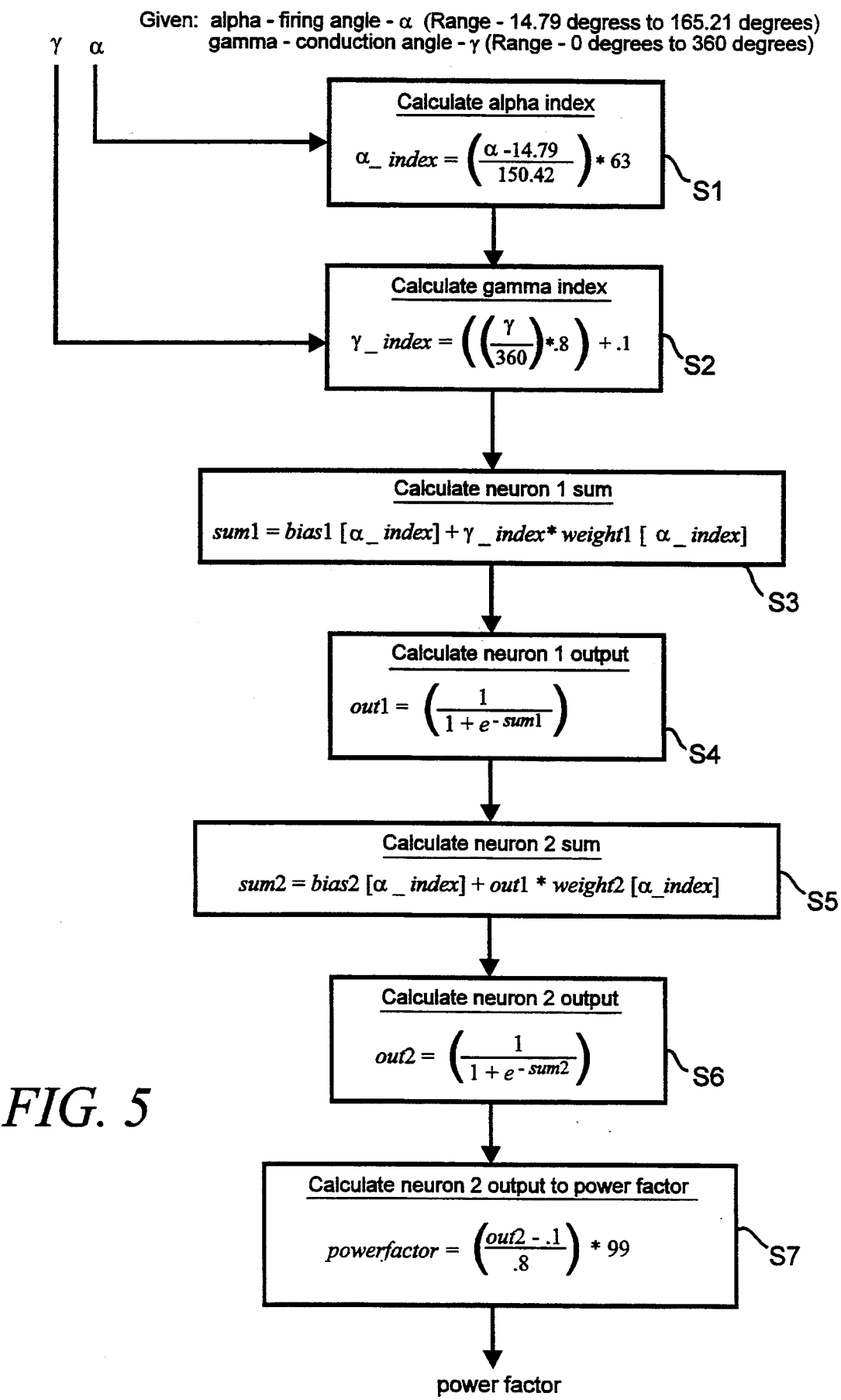
FIG. 5 is a dataflow diagram showing a system for calculating power factor utilizing the neural network of the present invention.

A more detailed description of the power factor neural network is presented by the flow diagram of FIG. 5. The two inputs are alpha, which represents the delayed firing angle a, and gamma, which is the conduction angle. Alpha has a range from 14.79 degrees to a 165.21 degrees. Gamma ranges from 0 to 360 degrees. Calculation of the power factor begins by scaling both alpha and gamma to engineering units in steps S1 and S2 since there are 64 layers for alpha, the alpha index is multiplied by 63 over its range of 150.42 degrees. The first summation S3 in neuron 1 will add the precalculated bias1 for the given alpha index to the scaled gamma index that has been multiplied with weight1 for the given alpha index to produce sum1. This sum is inputted to the sigmoid function S4 to calculate the output of the first neuron. This output is summed at S5 with the second set of precalculated biases and weights for the given alpha index. The output of the second neuron is calculated by the second sigmoid function S6 scaled to power factor unit of percentage at step S7. A C source file for the neural network method follows:

```
float pf_calc_nn(alpha,gamma)
char alpha;
float gamma;
{
float sum1, sum2,hidden_out;
float w1[]={
  −8.0924,   −8.0711,    −8.1058,   −8.1008,   −8.1526,
  −8.1136,   −8.1189,    −8.1571,   −8.1535,   −8.2689,
  −8.2330,   −8.2477,    −8.2652,   −8.4225,   −8.3158,
  −8.3146,   −8.3469,    −8.3867,   −8.4500,   −8.5374,
  −8.6032,   −8.6939,    −8.7863,   −8.9001,   −9.0127,
  −9.1330,   −9.2611,    −9.3887,   −9.5258,   −9.6693,
  −9.8287,   −10.0019,   −10.1992,  −10.4325,  −11.1593,
  −11.7397,  −12.2741,   −12.6146,  −13.0580,  −13.6976,
  −14.3533,  −15.1552,   −15.9496,  −16.9671,  −18.0480,
  −18.6797,  −19.9421,   −21.0377,  −22.6062,  −24.5386,
  −25.8518,  −28.9500,   −31.4667,  −34.6626,  −38.8001,
  −41.7079,  −45.8587,   −52.8544,  −59.6002,  −69.8643,
  −82.2876,  −96.1516,   −116.7107, −149.8014
};
float bias1[]={4
  4.2262,   4.1908,   4.1644,   4.1317,   4.1295,
  4.0844,   4.0736,   4.0477,   4.0403,   4.0636,
  4.0185,   4.0085,   4.0006,   4.0721,   3.9867,
  4.0047,   4.0163,   4.0127,   4.0073,   3.9932,
  3.9920,   3.9944,   3.9986,   3.9988,   4.0068,
  4.0271,   4.0557,   4.1076,   4.1347,   4.1830,
  4.2349,   4.2811,   4.3494,   4.4536,   4.9814,
  5.2211,   5.4157,   5.5229,   5.6651,   5.8772,
  6.0780,   6.3363,   6.5706,   6.8810,   7.1759,
  7.2909,   7.6221,   7.8661,   8.2437,   8.7192
  8.9382,   9.7069,   10.2247,  10.8806,  11.7335,
  12.1663,  12.8759,  14.1830,  15.2800,  17.0506,
  19.0432,  21.0713,  24.0716,  28.9224
};
float w2[]={
  8.8025,   8.7867,   8.7885,   8.7790,   8.7732,
  8.7675,   8.7661,   8.7747,   8.7712,   8.7238,
  8.7781,   8.7861,   8.7967,   8.6698,   8.8218,
  8.8192,   8.8345,   8.8459,   8.8802,   8.9172,
  8.9632,   9.0205,   9.0811,   9.1497,   9.2266,
  9.3083,   9.3929,   9.4719,   9.5523,   9.6300,
  9.7187,   9.8196,   9.9354,   10.0774,  10.1654,
  10.2830,  10.3729,  10.6977,  10.9875,  11.1542,
  11.4340,  11.7243,  12.1101,  12.4545,  12.7532,
  13.2522,  13.7401,  14.6854,  14.6854,  15.3519,
  15.9577,  16.8383,  17.5861,  18.5565,  19.6862,
  20.7578,  22.4637,  23.9411,  25.5810,  28.4004,
  31.0892,  34.0480,  38.2338,  44.2762
}
```

-continued

```
float bias2[]={
   -2.8867,    -2.9191,    -2.9265,    -2.9632,    -2.9585,
   -3.0370,    -3.0567,    -3.0815,    -3.1303,    -3.1274,
   -3.1961,    -3.2531,    -3.3169,    -3.3377,    -3.4600,
   -3.5894,    -3.6809,    -3.7396,    -3.7835,    -3.8081,
   -3.8695,    -3.9115,    -3.9582,    -4.0043,    -4.0618,
   -4.1488,    -4.2640,    -4.4138,    -4.5321,    -4.6716,
   -4.8332,    -4.9716,    -5.1656,    -5.4238,    -6.1999,
   -6.5027,    -6.6904,    -7.0749,    -7.4288,    -7.6774,
   -8.0439,    -8.4295,    -8.8906,    -9.3332,    -9.7083,
  -10.1890,   -10.7505,   -11.2652,   -11.7734,   -12.5192,
  -13.1041,   -14.1220,   -14.9051,   -15.9316,   -17.1302,
  -18.1687,   -19.8708,   -21.4369,   -23.0939,   -25.9673,
  -28.7119,   -31.6503,   -35.8716,   -41.9807
};
   sum1 = bias1[alpha]+(gamma*w1[alpha]);
   hidden_out = 1/(1+exp(-sum1));
   sum2 = bias2[alpha]+(hidden_out*w2[alpha]);
   return(1/(1+exp(-sum2)));
```

Both the neural network and the table lookup method implementations have merit. For the above application having 64 possible values for alpha and gamma, the neural network would require a code having 1963 bytes. The look up table method, on the other hand would require 18,156 bytes. This 10 to 1 ratio in memory requirements can be significant.

While the specific embodiments have been illustrated and described, numerous modifications are possible without departing from the scope or spirit of the invention. Although the power factor calculation is shown for usage with a weld controller, additional implementations of other types of controls utilizing power factor are possible. For instance, many types of motor controllers require power factor correction and or monitoring. UPS systems often have power factor optimization circuits. The neural network described herein is readily adaptable for use with any type of system requiring power factor calculations.

I claim:

1. An apparatus for calculating power factor of a control system utilizing phase controlled switches supplying output power to an inductive and resistive load, said apparatus comprising:

A a microprocessor for generating firing pulses for every half cycle period of conduction for controlling operation of said phase controlled switches, said firing pulses having variable firing angle delay times;

B a first detector for determining a first time interval alpha representative of said firing angle delay time for energizing said phase controlled switches;

C a second detector for determining a second time interval gamma representative of a total conduction time of said phase controlled switches for each half cycle period of conduction;

D a neural network operating in said microprocessor, said neural network for calculating said power factor, said network comprising three layers fully connected including an input layer for receiving data representing alpha and gamma, a hidden layer having a single neuron and an output layer having a single neuron for computing said power factor, and for scaling and providing constant data relating to said power factor; and E control means within said microprocessor for using said data relating to said power factor with a predetermined schedule for varying said firing angle delay times.

2. The apparatus of claim 1 wherein said neural network is trained off-line using backpropagation techniques to compute values for network weights and biases, said training using data from a preprocessed solution of equations relating power factor to alpha and gamma.

3. The apparatus of claim 2 wherein said equations relating power factor to alpha and gamma are $$\sin(\text{alpha}+\text{gamma}-\theta)=\sin(\text{alpha}-\theta)*\exp[-\text{gamma}/\tan\theta]$$

where
   $\theta = \arctan(wL/R)$
   power factor $= \cos(\theta)$
   L = inductance of output load
   R = resistance of output load.

4. The apparatus of claim 1 wherein said control system is a resistance welder.

5. The apparatus of claim 4 wherein said resistance welder includes a stepper program for increasing weld power as contact tips deteriorate, and wherein said calculated power factor for use in determining actual weld power.

6. The apparatus of claim 4 wherein said resistance welder includes a means of compensating for contact tip wear and uses said calculated power factor for determining a change in resistance of said output contacts and associated interconnecting wiring by comparing consecutive power factor calculations to detect changes in said power factor, said changes to reflect changes in resistance requiring said compensation.

7. An apparatus for controlling the quality of a weld in a resistance weld controller having a pair of welding electrodes connected to a secondary winding of welding transformer and an AC source connected to a primary winding of said welding transformer, said AC source for supplying alternating polarity half cycles of welding current to said weld transformer using phase controlled switches, said apparatus comprising:

A means for measuring a first time interval representative of a firing angle delay time for energizing said phase controlled switches;

B means for measuring a second time interval representative of a total conduction time of said phase controlled switches for each half cycle period of conduction;

C a neural network for calculating a power factor, said network comprising three layers fully connected including an input layer for receiving data representing said first and second time intervals, a hidden layer having a single neuron and an output layer having a single neuron for computing said power factor, and for scaling and providing constant data relating to said power factor; and D control means for using said data relating to said power factor with a predetermined weld schedule for varying said firing angle delay times.

8. The apparatus of claim 7 wherein said neural network is trained off-line using backpropagation techniques to compute values for network weights and biases, said training using data from a preprocessed solution of equations relating power factor to said first time interval and said second time interval.

9. The apparatus of claim 8 wherein said equations relating power factor to said first time interval and said second time interval are $$\sin(\text{alpha}+\text{gamma}-\theta) = \sin(\text{alpha}-\theta) * \exp[-\text{gamma}/\tan\theta]$$

where
$\theta = \arctan(wL/R)$
power factor $= \cos(\theta)$
L = inductance of output load
R = resistance of output load
alpha = first time interval, and
gamma = second time interval.

10. The apparatus of claim 7 wherein said resistance welder includes a stepper program for increasing weld power as contact tips deteriorate, and wherein said calculated power factor for use in determining actual weld power.

11. The apparatus of claim 7 wherein said resistance welder includes a means of compensating for contact tip wear and uses said calculated power factor for determining a change in resistance of said output contacts and associated interconnecting wiring by comparing consecutive power factor calculations to detect changes in said power factor, said changes to reflect changes in resistance requiring said compensation.

12. An apparatus for use with a resistance welder for calculating power factor of a secondary circuit of a weld transformer supplying weld current to a pair of weld electrodes, said weld transformer receiving power through a phase controlled switch, said apparatus comprising:

A a neural network for learning in advance samples of time dependent signals relating to a first time interval representing a phase angle delay time for energizing said phase controlled switch and to a second time interval relating to length of time said phase controlled switch conducts and for processing said first and second time intervals to produce an output signal corresponding to said power factor when actual data representing said first and second time intervals are inputted to said neural network;

B a first means for inputting to said neural network data representing said first time interval during operation of said resistance welder;

C a second means for inputting to said neural network data representing said second time interval during operation of said resistance welder; and D means for outputting from said neural network data representing said calculated power factor for use of and during operation of said resistance welder.

13. The apparatus of claim 12 wherein said neural network comprises a plurality of identical three layer, fully connected neural networks, each of said plurality of three layer networks including an input layer for receiving data representing said second time interval, a hidden layer and an output layer having a single neuron for computing said power factor, and for scaling and providing constant data relating to said power factor.

14. The apparatus of claim 13 wherein each of said plurality of three layer networks represents one set of weights and biases for a particular value of said first time interval.

15. The apparatus of claim 14 wherein said neural network is trained off-line using backpropagation techniques to compute values for said sets of weights and biases, said training using data from a preprocessed solution of equations relating power factor to said first time interval and said second time interval.

16. The apparatus of claim 15 wherein said equations relating power factor to said first time interval and said second time interval are $$\sin(\text{alpha}+\text{gamma}-\theta) = \sin(\text{alpha}-\theta) * \exp[-\text{gamma}/\tan\theta]$$

where
$\theta = \arctan(wL/R)$
power factor $= \cos(\theta)$
L = inductance of output load
R = resistance of output load
alpha = first time interval, and
gamma = second time interval.

* * * * *